(12) United States Patent
Chen et al.

(10) Patent No.: US 8,908,811 B2
(45) Date of Patent: Dec. 9, 2014

(54) METHOD AND SYSTEM FOR ACQUIRING CHANNEL STATE INFORMATION

(75) Inventors: Yijian Chen, Shenzhen (CN); Jun Xu, Shenzhen (CN); Bo Dai, Shenzhen (CN); Ruyue Li, Shenzhen (CN); Junfeng Zhang, Shenzhen (CN)

(73) Assignee: ZTE Corporation (CN)

( * ) Notice: Subject to any disclaimer, the term of this patent is extended or adjusted under 35 U.S.C. 154(b) by 199 days.

(21) Appl. No.: 13/501,553

(22) PCT Filed: Nov. 2, 2010

(86) PCT No.: PCT/CN2010/078341
§ 371 (c)(1),
(2), (4) Date: Apr. 12, 2012

(87) PCT Pub. No.: WO2011/097902
PCT Pub. Date: Aug. 18, 2011

(65) Prior Publication Data
US 2012/0207240 A1    Aug. 16, 2012

(30) Foreign Application Priority Data
Feb. 12, 2010  (CN) .......................... 2010 1 0125662

(51) Int. Cl.
*H04L 27/06*     (2006.01)
*H04B 7/06*      (2006.01)
*H04B 7/04*      (2006.01)
*H04B 7/02*      (2006.01)

(52) U.S. Cl.
CPC ............ *H04B 7/0639* (2013.01); *H04B 7/0417* (2013.01); *H04B 7/063* (2013.01); *H04B 7/024* (2013.01); *H04B 7/0626* (2013.01)
USPC ........... 375/340; 375/316; 375/295; 375/219; 370/329; 370/332

(58) Field of Classification Search
CPC .. H04B 7/0413; H04B 7/0417; H04B 7/0621; H04B 7/063; H04B 7/0632; H04B 7/0634; H04B 7/0639; H04B 7/024; H04B 7/0626
USPC ........... 375/340, 316, 295, 219; 370/329, 332
See application file for complete search history.

(56) References Cited

U.S. PATENT DOCUMENTS 8,315,346 B2    11/2012 Kim et al.
(Continued)

FOREIGN PATENT DOCUMENTS

CN            1946000 A      4/2007
(Continued)

OTHER PUBLICATIONS

PCT International Search Report Dated Feb. 10, 2011, Application No. PCT/2010/078341, Applicant ZTE Corporation et al.
Korean Office Action Dated Nov. 13, 2013, Application No. 10-2012-7008815, 5 Pages.

(Continued)

*Primary Examiner* — Zewdu Kassa
(74) *Attorney, Agent, or Firm* — Brooks Kushman P.C.

(57) ABSTRACT

A method for acquiring channel state information is disclosed in the present invention, including: a user equipment (UE) reporting codebook index information and information about the total number of layers to a base station (eNB), wherein the codebook index information includes one of the following information: class 2 codebook index l; and class 1 codebook index i and index parameter j; and after receiving the codebook index information and information about the total number of layers sent by the UE, the base station obtaining a codeword in the manner of inquiring of a preset codebook list or in the manner of inquiring of the preset codebook list in conjunction with calculation according to the codebook index information and information about the total number of layers. A system for acquiring channel state information is also disclosed in the present invention.

7 Claims, 2 Drawing Sheets

(56) References Cited

U.S. PATENT DOCUMENTS

| | | |
|---|---|---|
| 2011/0122971 A1 | 5/2011 | Kim et al. |
| 2011/0170427 A1* | 7/2011 | Koivisto et al. ............... 370/252 |
| 2013/0129013 A1* | 5/2013 | Han et al. ...................... 375/295 |

FOREIGN PATENT DOCUMENTS

| | | |
|---|---|---|
| CN | 101395823 A | 3/2009 |
| CN | 101800628 A | 8/2010 |
| JP | 2009530898 A | 8/2009 |
| WO | 2009125954 A1 | 10/2009 |

OTHER PUBLICATIONS

Huawei, "Extensions to Rel-8 Type CQI/PMI/RI Feedback Using Double Codebook Structure", R1-100251, 3GPP TSG RAN WG1#59bis, Valencia, Spain, Jan. 18-22, 2010, Agenda Iten: 7.2.4.1, 4 Pages.

Samsung, Texas Instrumens, LG Electronics, NEC, RIM, "Proposal for Rel-10 Feedback Framework", R1-1-794, 3GPP TSG RAN WG1 #59bis, Valencia, Spain, Jan. 18-22, 2010, Agenda item: 7.2.4, 2 Pages.

Japanese Office Action Dated Jan. 17. 024112, 2 Pages.

* cited by examiner

METHOD AND SYSTEM FOR ACQUIRING CHANNEL STATE INFORMATION

CROSS-REFERENCE TO RELATED APPLICATIONS

This application is a U.S. national phase of PCT Application No. PCT/CN2010/078341 filed Nov. 2, 2010 which claims priority to Chinese Application No. 201010125662.3 filed Feb. 12, 2010, the disclosures of which are incorporated in their entirety by reference herein.

TECHNICAL FIELD

The present invention relates to the field of digital communication, and especially, to a method and system for acquiring channel state information.

BACKGROUND OF THE RELATED ART

The protocol in the long term evolution (LTE) system is release 8 (R8), and the information reflecting the channel state information (CSI) has three forms: channel quality indication (CQI), pre-coding matrix indicator (PMI), and rank indicator (RI).

CQI is an indicator for measuring the quality of the downlink channel. In the 36-213 protocol, CQI is represented using an integer value from 0 to 15, which respectively represents different CQI levels. Different CQIs correspond to respective modulation manners and coding rates (i.e. modulation coding scheme, MCS), which have 16 situations in total, and they can be represented using 4-bit information.

PMI means that only in the transmission mode of closed loop spatial multiplexing, the user equipment (UE) tells the eNode B (eNB) to use what kind of pre-coding matrix to pre-code the physical downlink shared channel (PDSCH) sent to the UE according to the measured channel quality. The feedback granularity of PMI can be that the whole bandwidth feeds back one PMI or that the PMI is fed back according to the subband.

RI is used to describe the number of spatially independent channels and corresponds to the rank of a channel response matrix. Under the modes of open loop spatial multiplexing and closed loop spatial multiplexing, the UE needs to feed back RI information, while it does not need to feed back RI information under other modes. The rank of the channel matrix corresponds to the number of layers of the downlink transmission, therefore, the UE feeding back the RI information to the eNode B is exactly feeding back the number of layers of the downlink transmission.

The transport layer is the concept of multi-antenna "layer" in LTE and LTE-A, represents the number of effective independent channels in the spatial multiplexing and corresponds to the antenna ports in release 10 one by one, wherein the antenna port in release 10 is a logic port and the total number of the transport layers is precisely RI. In addition, in IEEE802.16m, layer corresponds to the concept of "MIMO stream" and they have the same physical meaning.

In the LTE system, the feedback of CQI, PMI or RI can be periodic feedback and can also be non-periodic feedback. CQI and PMI can be sent simultaneously, or CQI, PMI and RI can be sent simultaneously. Wherein, as to periodic feedback, if the UE does not need to send data, then the CSI of periodic feedback is transmitted over the physical uplink control channel (PUCCH) in the format of 2 or 2a or 2b (PUCCH format2/2a/2b), and if the UE needs to send data, then the CSI is transmitted over the physical uplink shared channel (PUSCH); and as to non-periodic feedback, it is only transmitted over the PUSCH.

In related art, another method is to rotate the LTE codebook using relevant matrix information of the channel, i.e. mathematical transformation of the codebook of release R8:

$$C = R^{\frac{1}{2}} \times C_{R8}$$

where C represents the codebook obtained after the rotation of $C_{R8}$, $R=H^H H$, H is a channel matrix with a dimension of $N_r \times N_t$, $N_r$ is the number of receiving antennae, and $N_t$ is the number of transmitting antennae.

Since the channel matrix information includes the distribution information of the characteristic vector, the codeword in the codebook will also be quantized in an area with a relatively bigger distribution probability regarding the distribution probability of the characteristic vector after being rotated, thereby further improving the quantization precision.

The long term evolution advanced (LTE-A) as the evolution standard of LTE needs to support larger system bandwidth (up to 100 MHz), and the average frequency spectrum efficiency and the frequency spectrum efficiency of the margin users of the cell need to be increased, and the protocol thereof is release 10 (R10). For this end, many new technologies have been introduced into the LTE-A system: (1) downlink high-level multiple input multiple output (MIMO), the downlink of the LTE system at most supports 4-antenna transmission while the introduction of high-level MIMO enables the LTE-A system to at most support 8-antenna transmission in the downlink, then the number of dimensions of the channel state matrix is increased; (2) coordinated multiple point transmission (CoMP transmission), this technology is to use the coordinated transmission of the transmitting antennae of a plurality of cells, then the UE may need to feed back the channel state information of a plurality of cells.

A plurality of antennae are used at the transmission end (eNB), and the transmission rate can be improved in the manner of spatial multiplexing, i.e. different data are transmitted at different antenna locations on the same time frequency resource at the transmission end. A plurality of antennae can also be used at the receiving end (UE), and all the antenna resources can be allocated to the same user in the situation of single user, such transmission form is referred to as single user-MIMO (SU-MIMO); in addition, different antenna space resources can be allocated to different uses in the situation of multiple user, and such transmission form is referred to as multiple user-MIMO (MU-MIMO). In the single transmission mode, the eNB can dynamically select the downlink SU-MIMO transmission or MU-MIMO transmission according to the reported channel state information, which is referred to as SU/MU MIMO dynamic switching.

Hereinafter, the general processing procedure of the transmission mode of dynamic switching between the single user-MIMO and multiple user-MIMO will be described below:

firstly, the transmission end sends a pilot to the user equipment for the user equipment to test the downlink channel state, and the user equipment estimates the downlink channel according to the received pilot information and determines the format of the feedback channel state information and reports the channel state information, then the eNB dynamically selects the downlink SU-MIMO transmission or MU-MIMO transmission mode according to the reported channel state information and carries out communication according to the selected transmission mode.

As to the transmission mode of dynamic switching between the single user-MIMO and multiple user-MIMO, on one hand, backward compatibility needs to be maintained so as to support the priority principle of SU-MIMO and be compatible with the feedback forms of CQI/PMI/RI of R8 as much as possible, on the other hand, forward compatibility needs to be taken into account so as to consider the support of MU-MIMO and COMP and ensure that the new technology has acceptable performance. The precision of the existing channel information reporting method is rather low, which causes the eNode B to be unable to correctly select the downlink channel used when sending data to the UE, thereby leading to the result that the MU-MIMO system cannot reach rational performance.

SUMMARY OF THE INVENTION

The technical problem to be solved by the present invention is to provide a method and system for acquiring channel state information so as to be able to be compatible with SU-MIMO and MU-MIMO and ensure the system performance of MU-MIMO.

In order to solve the above technical problem, the present invention provides a method for acquiring channel state information, and the method includes:

a user equipment (UE) reporting codebook index information and information about a total number of layers to an eNode B (eNB), wherein the codebook index information comprises one of the following information: class 2 codebook index l; and class 1 codebook index i and index parameter j; and after receiving the codebook index information and information about the total number of layers sent by the UE, the eNode B obtaining a codeword in the manner of inquiring of a preset codebook list or in the manner of inquiring of the preset codebook list in conjunction with calculation according to the codebook index information and information about the total number of layers.

The codebook corresponding to the class 1 codebook index is a codebook of release 8 (R8) or a codebook obtained by a mathematical transformation of the codebook of R8; and the codebook corresponding to the class 2 codebook index is a new codebook of release 10 (R10).

When the code index information comprises the class 1 codebook index i and index parameter j, in the step of obtaining the codeword, the eNode B obtains the codeword by inquiring of the preset codebook list using the class 1 codebook index i, index parameter j, and the total number of layers $\upsilon$ as an index, with the preset codebook list including a table 1; wherein as to table 1, if a class 1 codebook index i, an index parameter j and a total number of layers $\upsilon$ are given, a unique complex matrix $CMat_{ij}^{v}$ will be directly given, wherein i=0, 1, ..., $2^{NB_1}$, j=0, 1 ... $2^{NB_2}$, $CMat_{ij}^{v}$ represents a codeword of a class 2 codebook and is a complex matrix, $NB_1$ and $NB_2$ are positive integral numbers greater than 0 and respectively represent the size of the class 1 codebook and that of the class 2 codebook, wherein $CMat_{ij}^{v}$ is a $N_T \times 1$ matrix or a $N_T \times 2$ matrix; and $N_T$ represents a number of antenna ports of the eNode B (eNB).

When the code index information comprises the class 1 codebook index i and index parameter j, in the step of obtaining the codeword, the eNode B obtains the codeword by inquiring of the preset codebook list using the class 1 codebook index i, index parameter j, and the total number of layers $\upsilon$ as an index, with the preset codebook list including a table 2; wherein as to table 2, if the class 1 codebook index i and a total number of layers $\upsilon$ are given, a unique complex matrix $AMat_i^{v}$ will be directly given, where i=0, 1, ..., $2^{NB_1}$, $AMat_i$ represents a codeword of a class 1 codebook and is a complex matrix $N_T \times \upsilon$, and $NB_1$ is a positive integral number greater than 0 and represents the size of the class 1 codebook; and $N_T$ represents the number of antenna ports of the eNode B (eNB).

The eNode B obtains the codeword of the class 2 codebook according to the table 1, or obtains the codeword of the class 1 codebook according to the table 2.

When the code index information comprises the class 2 codebook index l, the class 2 codebook index l includes a value of the class 1 codebook index i; in the step of obtaining the codeword, the eNode B obtains the codeword by inquiring of the preset codebook list using the class 2 codebook index l and the total number of layers $\upsilon$ as an index and using the class 1 codebook index i and the total number of layers $\upsilon$ as the index, with the preset codebook list including a table 3 and a table 4; wherein as to table 3, if a class 2 codebook index l and a total number of layers $\upsilon$ are given, a unique complex matrix $CMat_l^{v}$ will be directly given, $CMat_l^{v}$ represents a complex matrix, $CMat_l^{v}$ is a $N_T \times 1$ matrix or $N_T \times 2$ matrix, and l=0, 1, ..., $2^{NB_1+NB_2}$, $NB_1$ and $NB_2$ are positive integral number greater than 0; and as to table 4, if a class 1 codebook index i and a total number of layers $\upsilon$ are given, there is a unique corresponding complex matrix $AMat_i^{v}$, where i=func(l) represents that i is a function of l, $AMat_i^{v}$ represents a $N_T \times \upsilon$ complex matrix, $NB_1$ is a positive integral number greater than 0 and represents the size of the class 1 codebook; wherein $N_T$ is the number of antenna ports of the eNode B (eNB).

The eNode B obtains the codeword of the class 2 codebook according to the table 3, obtains the codeword of the class 1 codebook according to the table 4.

The i=func(l) is i=floor($l/2^{NB_1}$), with floor representing rounding down.

In the step of obtaining the codeword in the manner of inquiring of the preset codebook list in conjunction with calculation, the class 2 codeword is obtained by way of a rotation algorithm or phase adjustment algorithm.

In the step of obtaining the codeword in the manner of inquiring of the preset codebook list in conjunction with calculation, the class 2 codeword is obtained by way of a rotation algorithm and phase adjustment algorithm, which comprises: a part of the codeword in the class 2 codebook is obtained by calculation using the rotation algorithm; and another part of the codeword in the class 2 codebook is obtained by calculation using the phase adjustment algorithm.

The rotation algorithm means multiplying a rotation matrix by the codeword in a predetermined codebook B to obtain the codeword of the class 2 codebook.

The predetermined codebook B is obtained by compressing all codewords in a known codebook C, and the compression means multiplying a compression matrix by the codebook C.

The codebook C is a class 1 codebook or other codebook given by a protocol, and if the codebook C is a class 1 codebook, then a size of the codebook C is the size of the class 1 codebook, and the codeword of the codebook C is the codeword of the class 1 codebook.

The step of obtaining the codebook B by compressing the codebook C includes:

obtaining the codebook B by calculation using the following formula:

$$CWB(j) = MatCmprs(j) \cdot CWC(j)$$

where CWB(j) represents the $j^{th}$ codeword of the codebook B, CWC(j) represents the $j^{th}$ codeword of the codebook C, codebook index j=0, 1, . . . , NBC, NBC is a positive integral number greater than 1, CWB(j) represents the $j^{th}$ codeword of the codebook B, and MatCmprs(i) is a diagonal matrix and the size thereof is $N_T \times N_T$, $$MatCmprs(j) = \begin{bmatrix} \sqrt{1-\alpha^2(1-\beta^2)}/\beta & & & \\ & \alpha & & \\ & & \ddots & \\ & & & \alpha \end{bmatrix},$$

where α is a constant, represents a compression rate and is a positive real number, and β represents an absolute value of a first element of the codeword CWC(j).

The manner of obtaining the class 2 codebook by rotating the codebook B comprises:

obtaining the class 2 codebook by calculation using the following formula:

$$CW2(i,j) = MatRot(i) \cdot CWB(j)$$

Where i is a class 1 codebook index i=0, 1, . . . , NB1, codebook index j=0, 1, . . . , NBC, CWB(j) represents the $j^{th}$ codeword of the codebook B, CW2 (i, j) represents the $j^{th}$ codeword in the NBC codewords obtained by rotating the $i^{th}$ codeword of the class 1 codebook, NBC is a number of codewords in a codebook collection B, the MatRot(i) is a function of CW1 (i), CW1 (i), represents the $i^{th}$ codeword of the class 1 codebook, the MatRot(i) is a unitary matrix [CW1 (i) $O_{CW1(i)}^{\perp}$] or a unitary matrix [conj(CW1 (i)) $O_{CW1(i)}^{\perp}$] obtained according to CW1 (i), wherein conj (CW1 (i)) represents to conjugate CW1 (i), and $O_{CW1(i)}^{\perp}$ represents the $(N_T-1)^{th}$ column vector orthogonal with CW1 (i).

When the CW1 (i) is of one column, MatRot(i)=HH($\hbar$-CW1 (i)), wherein HH represents Household transformation, $\hbar$ is $[1\ 0\ 0\ 0]^T$, and NB1 and NBC are positive integral numbers greater than 1.

The phase adjustment algorithm means: carrying out phase adjustment on each element in the codeword of the class 1 codebook to finally obtain NJ codewords of the class 2 codebook, NJ is a positive integral number greater than 1, and the phase adjustment means multiplying a phase adjustment matrix by the codeword of the class 1 codebook, and the phase adjustment matrix is generated according to the codeword of the class 1 codebook.

The phase adjustment is carried out using the following formula:

CW2(i, j)=MatPhsAdj(j)·CW1(i), where CW1 (i) represents the $i^{th}$ codeword of the class 1 codebook, and MatPhsAdj(j) is a diagonal matrix, $$MatPhsAdj(j) = \begin{bmatrix} \exp((-1)^{1/2} \cdot \gamma_{0j}) & & & \\ & \exp((-1)^{1/2} \cdot \gamma_{1j}) & & \\ & & \ddots & \\ & & & \exp((-1)^{1/2} \cdot \gamma_{(N_T-1)j}) \end{bmatrix},$$

$\gamma_{0j}, \gamma_{1j}, \ldots, \gamma_{(N_T-1)j}$ respectively represent to carry out phase adjustment on the first to $N_T^{th}$ element of CW1(i), the values of which are within 0 to $2\pi$ or $-\pi$ to $+\pi$, CW2(i, j) represents to carry out phase adjustment on the $i^{th}$ codeword of the class 1 codebook to obtain the $j^{th}$ codeword in NJ codewords.

The $\gamma_{0j}, \gamma_{1j}, \ldots, \gamma_{(N_T-1)j}$ satisfy $\gamma_{ij}=(i+1)\cdot\theta_j$, wherein i=0, 1, . . . , $N_{T-1}$, j=0, 1, . . . , NJ, and $\theta_j$ is a phase value, which is within 0 to $2\pi$ or $-\pi$ to $+\pi$, and NJ is a positive integral number greater than 1.

The method further comprises:

the eNode B scheduling the UE by referring to the obtained codeword, selecting a downlink transmission manner to communicate with the UE, wherein the downlink transmission manner comprises one of the following: single user multiple input multiple output transmission mode, multi-user multiple input multiple output transmission mode, single user/multi-user dynamic switching transmission mode and coordinated multiple point transmission mode.

In order to solve the above technical problem, the present invention further provides a system for acquiring channel state information, comprising a user equipment (UE) and an eNode B, wherein the UE is configured to report codebook index information and information about a total number of layers to the eNode B, wherein the codebook index information comprises one of the following information: class 2 codebook index l; and class 1 codebook index i and index parameter j; and the eNode B is configured to, after receiving the codebook index information and information about the total number of layers sent by the UE, obtain a codeword in the manner of inquiring of a preset codebook list or in the manner of inquiring of the preset codebook list in conjunction with calculation according to the codebook index information and information about the total number of layers.

In the method of the present invention, when the user equipment sends channel state information to the network side, the index information of the codebook is carried in this information to indicate the channel state information of the downlink, so that on one hand, the network side can be compatible to use the channel state information format of R8 to achieve the multi-antenna function of R8, for example single user-MIMO; on the other hand, the network side significantly reduces quantization errors by way of a new codebook of R10, thereby greatly enhancing the performance of the MU-MIMO system. By way of the new method for generating and representing a new codebook, the transmission efficiency and transmission quality can be improved, which solves the problem that the MU-MIMO lacks accurate channel state information.

PREFERRED EMBODIMENTS OF THE PRESENT INVENTION

Figure 1:
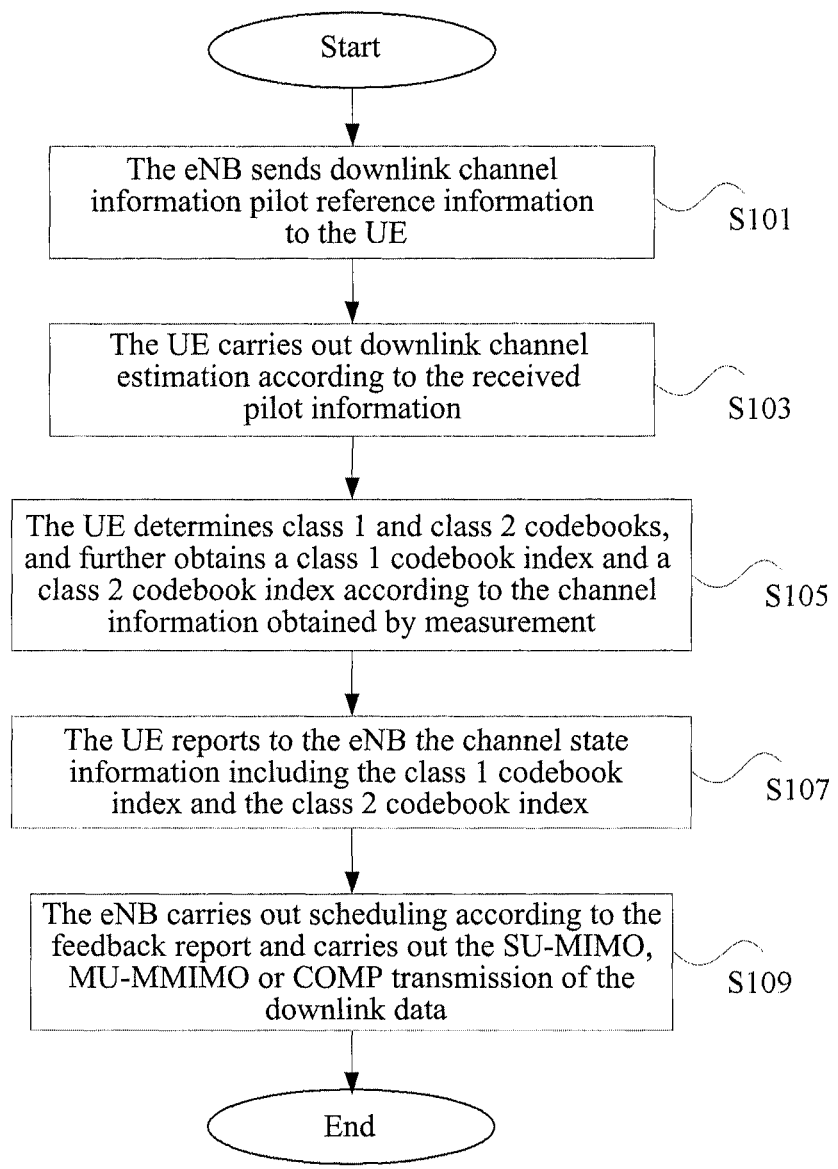
FIG. 1 is a communication process of single user-MIMO or multi user-MIMO using the codebook generation method in embodiment 1.

In order to obtain a higher peak frequency spectrum efficiency, in the LTE-A system, the downlink needs to support the dynamic switching between single user-MIMO and multi user-MIMO. On one hand, the feedback control signaling in the channel information needs to maintain backward compatibility so as to support the priority principle of SU-MIMO and be compatible with the feedback forms of CQI/PMI/RI of the existing release 8 as much as possible; on the other hand, forward compatibility needs to be taken into account for the feedback channel state information of the channel information, and a new R10 codebook needs to be designed to improve feedback precision, so as to better support MU-MIMO and COMP and ensure that the new technology has acceptable performance.

The inventive concept of the method for acquiring channel state information in the present invention is as follows: a user equipment (UE) reporting codebook index information and information about the total number of layers to an eNode B (eNB), wherein the codebook index information comprises one of the following information: class 1 codebook index i; class 2 codebook index l; and class 1 codebook index i and index parameter j; and after receiving the codebook index information and information about the total number of layers sent by the UE, the eNode B obtaining a codeword (precoding matrix) in the manner of inquiring of a preset codebook list or in the manner of inquiring of the preset codebook list in conjunction with calculation according to the codebook index information and information about the total number of layers.

The eNode B carries out scheduling on the UE by referring to the obtained codeword and selects a downlink transmission mode to communicate with the UE. The downlink transmission mode includes one of the following: SU-MIMO transmission mode, MU-MIMO transmission mode, single user/multiple user dynamic switching transmission mode and coordinated multiple point transmission mode (COMP).

Usually, after receiving the pilot information, the UE estimates the downlink channel to obtain an estimation value thereof, and acquires the codebook index information by inquiring of a present codebook list using the estimation value of the downlink channel, wherein the codebook index information includes one of the following information: class 1 codebook index i; class 2 codebook index l; and class 1 codebook index i and index parameter j. The class 1 codebook index and class 2 codebook index correspond to different transmission modes respectively. After acquiring the code index information, the UE sends the code index information and the information about the total number of layers to the eNode B. The sending to the eNode B by the UE can be periodic or non-periodic.

The codebook corresponding to the above class 1 codebook index is a codebook of R8 or a codebook obtained by the mathematical transformation of the codebook of R8; and the codebook corresponding to the class 2 codebook index is a new codebook in R10.

The above user equipment and eNode B have the same codebook list.

When the codebook index information is the class 1 codebook index i and index parameter j, then the eNode B inquires of the preset codebook list using the i, j and the total number of layers υ as the index, with the codebook list including a first table (indicated by Table 1 hereinafter) and a second table (indicated by Table 2 hereinafter), and the eNode B obtains the codeword of the class 1 codebook by inquiring of the first table, and acquires the codeword of the class 2 codebook by inquiring of the second table, which is particularly as follows:

the first table includes a class 1 codebook index i, the total number of layers υ and the codeword of the class 1 codebook. If the class 1 codebook index i and a total number of layers υ are given, a unique complex matrix $AMat_i^v$ will be directly determined, where i=0, 1, ..., $2^{NB_1}$, $AMat_i$ represents a codeword of a class 1 codebook and is a complex matrix $N_t \times v$ and $NB_1$ is a positive integral number greater than 0 and represents the size of the class 1 codebook; and the second table includes a class 1 codebook index i, index parameter j, the total number of layers υ and the codeword of the class 2 codebook. If the class 1 codebook index i, index parameter j and the total number of layers υ are given, a unique complex matrix $CMat_{ij}^v$ will be directly determined, wherein i=0, 1, ..., $2^{NB_1}$, j=0, 1, ..., $2^{NB_2}$, $CMat_{ij}^v$ represents a codeword of a class 2 codebook and is a complex matrix, $NB_1$ and $NB_2$ are positive integral numbers greater than 0 and respectively represent the size of the class 1 codebook and that of the class 2 codebook; wherein $CMat_{ij}^v$ is a $N_T \times 1$ matrix or a $N_T \times 2$ matrix. The size of $CMat_{ij}^v$ in the second table depends on the antenna configuration and channel relevance, and in general, for example, if the channel relevance is high or the antenna is a uniform linear antenna array (ULA), the size of $CMat_{ij}^v$ is $N_T \times 1$. The second table may include the situation where some codebooks are defaulted.

When the codebook index information is the class 2 codebook index l, the eNode B inquires of the preset codebook list using l and the total number of layers υ as well as i and υ as the index, with the class 2 codebook index l including the value of the class 1 codebook index i, the preset codebook list including a third table (indicated by Table 3 hereinafter) and a fourth table (indicated by Table 4 hereinafter), and the eNode B obtains the codeword of the class 2 codebook by inquiring of the third table, and obtains the codeword of the class 1 codebook by inquiring of the fourth table, which is in particular as follows:

the third table includes a class 2 codebook index l, the total number of layers υ and the codeword of the class 2 codebook. If the class 2 codebook index l and the total number of layers υ are given, a unique complex matrix $CMat_l^v$ will be directly determined. Wherein, $CMat_l^v$ represents a complex matrix, l=0, 1, ... $2^{NB_1+NB_2}$, $NB_1$ and $NB_2$ are positive integral numbers greater than 0; and $CMat_l^v$ is a $N_T \times 1$ matrix or $N_T \times 2$ matrix. In the third table, the size of the $CMat_l^v$ depends on the antenna configuration and channel relevance, and in general, for example, if the channel relevance is high or the antenna is a uniform linear antenna array (ULA), the size of $CMat_l^v$ is $N_T \times 1$. The third table may include the situation where some codebooks are defaulted.

The fourth table includes a class 1 codebook index i, a total number of layers υ and the codeword of a class 1 codebook, and if the class 1 codebook index i, the total number of layers υ are given, both of them have a unique corresponding complex matrix $AMat_i^v$, where i=func(l), which represents that i is a function of l, $AMat_i^v$ represents a $N_t \times v$ complex matrix, $NB_1$ is a positive integral number greater than 0 and represents the size of the class 1 codebook; wherein $N_T$ is the number of antenna ports of the eNode B (eNB). The i=func(l) is i=floor($l/2^{NB_1}$), with floor representing rounding down.

The $N_t$ and $N_T$ appearing herein have the same meaning, and both represent the number of the ports of the sending antenna.

After obtaining the codeword of the class 1 codebook by inquiring of the table, the determination of the codeword of the class 2 codebook can also be obtained by calculation. It can be obtained by using the rotation algorithm, or obtained by the phase adjustment algorithm, or obtained by the rotation algorithm and phase adjustment algorithm (a part of the codeword in the class 2 codebook is obtained by the rotation algorithm; and another part of the class 2 codebook is obtained by the phase adjustment algorithm).

The code index information and information about the total number of layers can be sent to the eNode B by way of different messages, and the sending time thereof can be the same or different.

Likewise, the above class 1 codebook index and class 2 codebook index can be sent to the eNode B simultaneously, or may not be sent to the eNode B simultaneously, and both of them have their own sending periods, which may be the same or different.

Hereinafter, the method of the present invention will be further described in conjunction with embodiments. Herein, the class 1 codebook $AMat_i^\nu$ is a codebook of R8 or a codebook obtained after mathematical transformation based on the codebook of R8, the class 2 codebook $CMat_i^\nu$ or $CMat_{ij}^\nu$ is a codebook of R10, therefore, the class 1 codebook index is used as the codeword index of SU-MIMO, and the class 2 codebook index can be used not only as the codeword index of SU-MIMO but also as the codeword index of MU-MIMO, i.e. being used for either the MU-MIMO transmission mode or SU-MIMO transmission mode. In the following embodiments, the class 1 codebook index is represented with i, the class 2 codebook index is represented with l, and the total number of layers is represented with $\upsilon$. In order to simultaneously carry the class 1 codebook index and class 2 codebook index using 8 bits, consecutive 4 bits in the 8 bits can be set as the value of i, and this i value and another consecutive 4-bit j value are used as the l value.

Embodiment 1

In this embodiment, the code index information sent by the UE to the eNode B only includes the class 1 codebook index, and the eNode B determines the codeword in a class 1 codebook as a pre-coding matrix by inquiring of a table according to the class 1 codebook index and the total number of layers $\upsilon$.

In particular, the eNode B uniquely determines a complex matrix as the pre-coding matrix by inquiring of a table in the preset class 1 codebook list according to the i and $\upsilon$, and reference can be made to Table 1 for the examples of the class 1 codebook list. The uniquely determined class 1 complex matrix is represented with $AMat_i^\nu$. $AMat_i$ represents the codeword of the class 1 codebook and is a $N_T \times \upsilon$ complex matrix, wherein $N_T$ is the number of the antenna ports of the eNode B, i=0, 1, ..., $2^{NB_1}$, $NB_1$ is a positive integral number greater than 0 and represents the size of the class 1 codebook. As to different i or different $\upsilon$, the corresponding class 1 complex matrix is also different.

TABLE 1

Illustration of class 1 codebook list

| class 1 codebook index i | Total number of layers | | | |
|---|---|---|---|---|
| | v = 1 | v = 2 | v = 3 | v = 4 |
| 0 | $AMat_0^{v=1}$ | $AMat_0^{v=2}$ | $AMat_0^{v=3}$ | $AMat_0^{v=4}$ |
| 1 | $AMat_1^{v=1}$ | $AMat_1^{v=2}$ | $AMat_1^{v=3}$ | $AMat_1^{v=4}$ |
| 2 | $AMat_2^{v=1}$ | $AMat_2^{v=2}$ | $AMat_2^{v=3}$ | $AMat_2^{v=4}$ |
| . | . | . | . | . |
| . | . | . | . | . |
| $2^{NB_1}-1$ | $\mathbf{AMat_{2^{NB_1}-1}^{v=1}}$ | $\mathbf{AMat_{2^{NB_1}-1}^{v=2}}$ | $\mathbf{AMat_{2^{NB_1}-1}^{v=3}}$ | $\mathbf{AMat_{2^{NB_1}-1}^{v=4}}$ |

Hereinafter, another more particular example will be given:

assuming that the number of the ports of the transmission antenna is $N_T=4$, $\upsilon=1$ and i are given, and the codeword of the class 1 codebook is defined as follows:

i=0; CW1=[0.5, 0.5, 0.5, 0.5]T
i=1; CW1=[0.5, 0+0.5i, −0.5, 0−0.5i]T
i=2; CW1=[0.5, −0.5, 0.5, −0.5]T
i=3; CW1=[0.5, 0−0.5i, −0.5, 0+0.5i]T
i=4; CW1=[0.5, 0.35355+0.35355i, 0+0.5i, −0.35355+0.35355i]T
i=5; CW1=[0.5, −0.35355+0.35355i, 0−0.5i, 0.35355+0.35355i]T
i=6; CW1=[0.5, −0.35355−0.35355i, 0+0.5i, 0.35355−0.35355i]T
i=7; CW1=[0.5, 0.35355−0.35355i, 0−0.5i, −0.35355−0.35355i]T
i=8; CW1=[0.5, 0.5, −0.5, −0.5]T
i=9; CW1=[0.5, 0+0.5i, 0.5, 0+0.5i]T
i=10; CW1=[0.5, −0.5, −0.5, 0.5]T
i=11; CW1=[0.5, 0−0.5i, 0.5, 0−0.5i]T
i=12; CW1=[0.5, 0.5, 0.5, −0.5]T
i=13; CW1=[0.5, 0.5, −0.5, 0.5]T
i=14; CW1=[0.5, −0.5, 0.5, 0.5]T
i=15; CW1=[0.5, −0.5, −0.5, −0.5]T

It needs to be noted that the present invention is not limited to the above values.

Embodiment 2

In this embodiment, the code index information sent by the UE to the eNode B includes i and j, and the eNode B determines a codeword of the class 2 codebook as the pre-coding matrix by inquiring of the table according to i, j and $\upsilon$.

In particular, the eNode B uniquely determines a class 2 complex matrix $CMat_{ij}^\nu$ as the pre-coding matrix by inquiring of a table in the preset class 2 codebook list according to i, j and $\upsilon$, and reference can be made to Table 2 for the illustration of the class 2 codebook list in which i, j and $\upsilon$ are used as the index; $CMat_{ij}^\nu$ represents the codeword of the class 2 codebook and is a complex matrix, with the size thereof being $N_T \times 1$ or $N_T \times 2$, wherein $N_T$ is the number of antenna ports of the eNode B, i=0, 1, ..., $2^{NB_1}$, j=0, 1, ..., $2^{NB_2}$, $NB_1$ and $NB_2$ are positive integral numbers greater than 0 and respectively represent the size of the class 1 codebook and that of the class 2 codebook. As to different i or different j or different $\upsilon$, the corresponding class 2 complex matrix is also different.

TABLE 2

Class 2 codebook list illustration with i, j and v being the index

| i | j | Total number of layers | | | |
|---|---|---|---|---|---|
| | | v = 1 | v = 2 | v = 3 | v = 4 |
| 0 | 0 | $CMat_{00}^{v=1}$ | $CMat_{00}^{v=2}$ | $CMat_{00}^{v=3}$ | $CMat_{00}^{v=4}$ |
| | 1 | $CMat_{01}^{v=1}$ | $CMat_{01}^{v=2}$ | $CMat_{01}^{v=3}$ | $CMat_{01}^{v=4}$ |
| | . | . | . | . | . |
| | . | . | . | . | . |

TABLE 2-continued

Class 2 codebook list illustration with i, j and v being the index

| | | Total number of layers | | | |
|---|---|---|---|---|---|
| i | j | v = 1 | v = 2 | v = 3 | v = 4 |
| | $2^{NB_2}-1$ | $CMat_{0(2^{NB_2}-1)}^{v=1}$ | $CMat_{0(2^{NB_2}-1)}^{v=2}$ | $CMat_{0(2^{NB_2}-1)}^{v=3}$ | $CMat_{0(2^{NB_2}-1)}^{v=4}$ |
| 1 | 0 | $CMat_{10}^{v=1}$ | $CMat_{10}^{v=2}$ | $CMat_{10}^{v=3}$ | $CMat_{10}^{v=4}$ |
| | 1 | $CMat_{11}^{v=1}$ | $CMat_{11}^{v=2}$ | $CMat_{11}^{v=3}$ | $CMat_{11}^{v=4}$ |
| | . | . | . | . | . |
| | . | . | . | . | . |
| | $2^{NB_2}-1$ | $CMat_{1(2^{NB_2}-1)}^{v=1}$ | $CMat_{1(2^{NB_2}-1)}^{v=2}$ | $CMat_{1(2^{NB_2}-1)}^{v=3}$ | $CMat_{1(2^{NB_2}-1)}^{v=4}$ |
| . | | | | | |
| . | | | | | |
| $2^{NB_1}-1$ | 0 | $CMat_{(2^{NB_1}-1)0}^{v=1}$ | $CMat_{(2^{NB_1}-1)0}^{v=2}$ | $CMat_{(2^{NB_1}-1)0}^{v=3}$ | $CMat_{(2^{NB_1}-1)0}^{v=4}$ |
| | 1 | $CMat_{(2^{NB_1}-1)1}^{v=1}$ | $CMat_{(2^{NB_1}-1)1}^{v=2}$ | $CMat_{(2^{NB_1}-1)1}^{v=3}$ | $CMat_{(2^{NB_1}-1)1}^{v=4}$ |
| | . | . | . | . | . |
| | . | . | . | . | . |
| | $2^{NB_2}-1$ | $CMat_{(2^{NB_1}-1)(2^{NB_2}-1)}^{v=1}$ | $CMat_{(2^{NB_1}-1)(2^{NB_2}-1)}^{v=2}$ | $CMat_{(2^{NB_1}-1)(2^{NB_2}-1)}^{v=3}$ | $CMat_{(2^{NB_1}-1)(2^{NB_2}-1)}^{v=4}$ |

The size of the above $CMat_{ij}^{v}$ depends on the antenna configuration and channel relevance, and in general, for example, when the channel relevance is high or the antenna is a uniform line array (ULA), then the size of $CMat_{ij}^{v}$ is $N_T \times 1$, otherwise, it is $N_T \times 2$.

As to the class 2 codeword, $CMat_{ij}^{v}$ is defaulted for some values of i and j.

If the eNode B is to schedule the UE as the MU-MIMO transmission mode or the SU/MU dynamic switching transmission mode, or COMP transmission mode, then the class 2 codebook index needs to be used in combination with the class 1 codebook index.

Hereinafter, another more particular example will be given:

assuming that the number of the ports of the transmission antenna is $N_T=4$, then the class 2 codebook will be directly defined in R10, and if any class of codebook index, any index value of the class 2 codebook and any value of the total number of layers are given, a corresponding complex matrix can be directly defined in R10, i.e. the codeword of the class 2 codebook.

For example, assuming that the total known number of layers is $v=1$, the class 1 and class 2 codebook indexes are respectively indicated as i and j, $NB_1=NB_2=4$, then the codeword of the class 2 codebook is indicated as CW2, and the codeword of the class 1 codebook is indicated as CW1.

$v=1$ and i are given, and reference can be made to the definition on the codeword of the class 1 codebook in Embodiment 1 for the definition on the codeword of the class 1 codebook.

$v=1$, i, and j are given, and the codeword of the class 2 codebook is defined as follows:

i=0, j=0; CW2=[0.82569, 0.32569, 0.32569, 0.32569]T
i=0, j=1; CW2=[0.32569, 0.57569−0.25i, 0.32569, 0.57569+0.25i]T
i=0, j=2; CW2=[0.32569, 0.32569, 0.82569, 0.32569]T
i=0, j=3; CW2=[0.32569, 0.57569+0.25i, 0.32569, 0.57569−0.25i]T
i=0, j=4; CW2=[0.45069−0.30178i, 0.62747+0.125i, 0.45069+0.051777i, 0.27392+0.125i]T
i=0, j=5; CW2=[0.45069−0.051777i, 0.27392−0.125i, 0.45069+0.30178i, 0.62747−0.125i]T
i=0, j=6; CW2=[0.45069+0.051777i, 0.27392+0.125i, 0.45069−0.30178i, 0.62747+0.125i]T
i=0, j=7; CW2=[0.45069+0.30178i, 0.62747−0.125i, 0.45069−0.051777i, 0.27392−0.125i]T
i=0, j=8; CW2=[0.32569, 0.82569, 0.32569, 0.32569]T
i=0, j=9; CW2=[0.57569−0.25i, 0.32569, 0.57569+0.25i, 0.32569]T
i=0, j=10; CW2=[0.32569, 0.32569, 0.32569, 0.82569]T
i=0, j=11; CW2=[0.57569+0.25i, 0.32569, 0.57569−0.25i, 0.32569]T
i=0, j=12; CW2=[0.57569, 0.57569, 0.57569, 0.075694]T
i=0, j=13; CW2=[0.57569, 0.57569, 0.075694, 0.57569]T
i=0, j=14; CW2=[0.57569, 0.075694, 0.57569, 0.57569]T
i=0, j=15; CW2=[0.075694, 0.57569, 0.57569, 0.57569]T
i=1, j=0; CW2=[0.32569, 0.25−0.57569i, −0.32569, 0.25+0.57569i]T
i=1, j=1; CW2=[0.82569, 0−0.32569i, −0.32569, 0+0.32569i]T
i=1, j=2; CW2=[0.32569, −0.25−0.57569i, −0.32569, −0.25+0.57569i]T
i=1, j=3; CW2=[0.32569, 0−0.32569i, −0.82569, 0+0.32569i]T
i=1, j=4; CW2=[0.45069+0.30178i, −0.125−0.627471, −0.45069+0.051777i, 0.125+0.27392i]T
i=1, j=5; CW2=[0.45069−0.30178i, 0.125−0.62747i, −0.45069−0.051777i, −0.125+0.27392i]T
i=1, j=6; CW2=[0.45069−0.051777i, −0.125−0.27392i, −0.45069−0.30178i, 0.125+0.62747i]T
i=1, j=7; CW2=[0.45069+0.051777i, 0.125−0.27392i, −0.45069+0.301781, −0.125+0.62747i]T
i=1, j=8; CW2=[0.57569+0.25i, 0−0.32569i, −0.57569+0.25i, 0+0.32569i]T
i=1, j=9; CW2=[0.32569, 0−0.82569i, −0.32569, 0+0.32569i]T
i=1, j=10; CW2=[0.57569−0.25i, 0−0.32569i, −0.57569−0.25i, 0+0.32569i]T
i=1, j=11; CW2=[0.32569, 0−0.32569i, −0.32569, 0+0.82569i]T
i=1, j=12; CW2=[0.32569+0.25i, 0−0.57569i, −0.32569+0.25i, 0+0.57569i]T
i=1, j=13; CW2=[0.57569, 0.25−0.32569i, −0.57569, 0.25+0.32569i]T i=1, j=14; CW2=[0.32569−0.25i, 0−0.57569i, −0.32569−0.25i, 0+0.57569i]T i=1, j=15; CW2=[0.57569, −0.25−0.32569i, −0.57569, −0.25+0.32569i]T i=2, j=0; CW2=[0.32569, −0.32569, 0.82569, −0.32569]T i=2, j=1; CW2=[0.32569, −0.57569−0.25i, 0.32569, −0.57569+0.25i]T

. . .

i=15, j=0; CW2=[0.075694, −0.57569, −0.57569, −0.57569]T i=15, j=1; CW2=[0.57569, −0.32569−0.25i, −0.57569, −0.32569+0.25i]T i=15, j=2; CW2=[0.57569, −0.57569, −0.075694, −0.57569]T i=15, j=3; CW2=[0.57569, −0.32569+0.25i, −0.57569, −0.32569−0.25i]T i=15, j=4; CW2=[0.45069+0.30178i, −0.27392+0.125i, −0.45069+0.051777i, −0.62747+0.125i]T i=15, j=5; CW2=[0.45069+0.051777i, −0.62747−0.125i, −0.45069+0.30178i, −0.27392−0.125i]T i=15, j=6; CW2=[0.45069−0.051777i, −0.62747+0.125i, −0.45069−0.30178i, −0.27392+0.125i]T i=15, j=7; CW2=[0.45069−0.30178i, −0.27392−0.125i, −0.45069−0.051777i, −0.62747−0.125i]T i=15, j=8; CW2=[0.57569, −0.075694, −0.57569, −0.57569]T i=15, j=9; CW2=[0.32569+0.25i, −0.57569, −0.32569+0.25i, −0.57569]T i=15, j=10; CW2=[0.57569, −0.57569, −0.57569, −0.075694]T i=15, j=11; CW2=[0.32569−0.25i, −0.57569, −0.32569−0.25i, −0.57569]T i=15, j=12; CW2=[0.32569, −0.32569, −0.32569, −0.82569]T i=15, j=13; CW2=[0.32569, −0.32569, −0.82569, −0.32569]T i=15, j=14; CW2=[0.32569, −0.82569, −0.32569, −0.32569]T i=15, j=15; CW2=[0.82569, −0.32569, −0.32569, −0.32569]T

It needs to be specially noted that the value of the codeword of the class 2 codebook and that of the codeword of the class 1 codebook are not limited to the examples described here.

Embodiment 3

In this embodiment, the code index information sent by the UE to the eNode B is the class 2 codebook index l, and the eNode B determines a codeword of the class 2 codebook as a pre-coding matrix according to l and $\upsilon$.

In particular, the eNode B uniquely determines a class 2 complex matrix $CMat_l^\upsilon$ by way of inquiring of the table in the preset class 2 codeword list according to l and $\upsilon$, and reference can be made to Table 3 for the illustration of the class 2 codebook with l and $\upsilon$ being used as the index; $CMat_l^\upsilon$ represent a complex matrix, i.e. the codeword in the class 2 codebook, wherein l=0, 1, . . . , $2^{NB_1+NB_2}$, $NB_1$ and $NB_2$ are positive integral numbers greater than 0, and $CMat_l^\upsilon$ is a $N_T \times 1$ matrix or $N_T \times 2$ matrix. The size of $CMat_l^\upsilon$ depends on the antenna configuration and channel relevance, and in general, for example, when the channel relevance is high or the antenna is a uniform line array (ULA), the size of $CMat_l^\upsilon$ is $N_T \times 1$.

The eNode B obtains the class 1 codebook index i by calculation according to l and obtains the unique complex matrix $AMat_i^\upsilon$ by inquiring of the table from the preset class 1 codebook list according to i and the total number of layers $\upsilon$ obtained by calculation. In this embodiment, the class 1 codebook list is as shown in Table 4, in which i=func(l) representing that i is a function of l, and in this embodiment, i=func(l) is i=floor($l/2^{NB_1}$), in which floor represents rounding down; and in other embodiments, other function relationships can also be used. $AMat_i^\upsilon$ represents a $N_t \times \upsilon$ complex matrix, $NB_1$ is a positive integral number greater than 0 and represents the size of the class 1 codebook; wherein $N_t$ is the number of antenna ports of the eNode B (eNB).

TABLE 3

Illustration of class 2 codebook list with l and v being the index

| Class 2 codebook index l | Total number of layers | | | |
|---|---|---|---|---|
| | v = 1 | v = 2 | v = 3 | v = 4 |
| 0 | $CMat_0^{v=1}$ | $CMat_0^{v=2}$ | $CMat_0^{v=3}$ | $CMat_0^{v=4}$ |
| 1 | $CMat_1^{v=1}$ | $CMat_1^{v=2}$ | $CMat_1^{v=3}$ | $CMat_1^{v=4}$ |
| 2 | $CMat_2^{v=1}$ | $CMat_2^{v=2}$ | $CMat_2^{v=3}$ | $CMat_2^{v=4}$ |
| 3 | $CMat_3^{v=1}$ | $CMat_3^{v=2}$ | $CMat_3^{v=3}$ | $CMat_3^{v=4}$ |
| 4 | $CMat_4^{v=1}$ | $CMat_4^{v=2}$ | $CMat_4^{v=3}$ | $CMat_4^{v=4}$ |
| . | . | . | . | . |
| $2^{NB_1+NB_2}-1$ | $CMat_{2^{NB_2}-1}^{v=1}$ | $CMat_{2^{NB_2}-1}^{v=2}$ | $CMat_{2^{NB_2}-1}^{v=3}$ | $CMat_{2^{NB_2}-1}^{v=4}$ |

TABLE 4

Illustration of class 1 codebook list

| Class 1 codebook index | Total number of layers | | | |
|---|---|---|---|---|
| i = floor($l/2^{NB_1}$) | v = 1 | v = 2 | v = 3 | v = 4 |
| 0 | $AMat_0^{v=1}$ | $AMat_0^{v=2}$ | $AMat_0^{v=3}$ | $AMat_0^{v=4}$ |
| 1 | $AMat_1^{v=1}$ | $AMat_1^{v=2}$ | $AMat_1^{v=3}$ | $AMat_1^{v=4}$ |
| 2 | $AMat_2^{v=1}$ | $AMat_2^{v=2}$ | $AMat_2^{v=3}$ | $AMat_2^{v=4}$ |
| . | . | . | . | . |
| $2^{NB_1}-1$ | $AMat_{2^{NB_1}-1}^{v=1}$ | $AMat_{2^{NB_1}-1}^{v=2}$ | $AMat_{2^{NB_1}-1}^{v=3}$ | $AMat_{2^{NB_1}-1}^{v=4}$ |

Hereinafter, another more particular example will be given:

assuming that the total number of layers $\upsilon$=1, the class 2 codebook index is indicated as l, $NB_1$=$NB_2$=4, and the class 2 codebook index is indicated as CW2, $\upsilon$=1 and l are known, then the codeword definition of the class 2 codebook is as follows:

l=0; CW1=[0.82569, 0.32569, 0.32569, 0.32569] T l=1; CW2=[0.32569, 0.57569−0.25i, 0.32569, 0.57569+0.25i]T l=2; CW2=[0.32569, 0.32569, 0.82569, 0.32569]T l=3; CW2=[0.32569, 0.57569+0.25i, 0.32569, 0.57569−0.25i]T l=4; CW2=[0.45069−0.30178i, 0.62747+0.125i, 0.45069+0.051777i, 0.27392+0.125i]T . . .

l=253; CW2=[0.32569, −0.32569, −0.82569, −0.32569]T l=254; CW2=[0.32569, −0.82569, −0.32569, −0.32569]T l=255; CW2=[0.82569, −0.32569, −0.32569, −0.32569]T

At this moment, if the index l of the class 2 codebook is known, then the index i of the class 1 codebook can be determined, i.e. l can determine the codeword of the class 1 codebook, for example, i=floor($l/2^{NB_1}$), Table 1 can exactly be used to obtain the codeword of the corresponding class 1 codebook, and the determination of the codeword of the class 1 codebook when l is known is as follows:

i=0; CW1=[0.5, 0.5, 0.5, 0.5] T l=16->31; CW1=[0.5, 0+0.5i, −0.5, 0−0.5i]T l=32->47; CW1=[0.5, −0.5, 0.5, −0.5]T
l=48->63; CW1=[0.5, 0−0.5i, −0.5, 0+0.5i]T
l=64->79; CW1=[0.5, 0.35355+0.35355i, 0+0.5i, −0.35355+0.35355i]T
l=80->95; CW1=[0.5, −0.35355+0.35355i, 0−0.5i, 0.35355+0.35355i]T
l=96->111; CW1=[0.5, −0.35355−0.35355i, 0+0.5i, 0.35355−0.35355i]T
l=112->127; CW1=[0.5, 0.35355−0.35355i, 0−0.5i, −0.35355−0.35355i]T
l=128->143; CW1=[0.5, 0.5, −0.5, −0.5]T
l=144->159; CW1=[0.5, 0+0.5i, 0.5, 0+0.5i]T
l=160->175; CW1=[0.5, −0.5, −0.5, 0.5]T
l=176->191; CW1=[0.5, 0−0.5i, 0.5, 0−0.5i]T
l=192->207; CW1=[0.5, 0.5, 0.5, −0.5]T
l=208->223; CW1=[0.5, 0.5, −0.5, 0.5]T
l=224->239; CW1=[0.5, −0.5, 0.5, 0.5]T
l=240->255; CW1=[0.5, −0.5, −0.5, 0.5]T

Where, l=0->15 represents that the value of l is within 0 to 15, and so forth, l is a positive integral number greater than or equal to 1.

It needs to be specially noted that the value of the codeword of the class 2 codebook and that of the codeword of the class 1 codebook are not limited to the examples described here.

Embodiment 4

The present embodiment mainly describes how to generate the codeword of the class 2 codebook by the rotation algorithm according to the codeword of the class 1 codebook, and the method of this embodiment can be used in conjunction with the methods in the above embodiments 2-3.

The rotation algorithm means multiplying a rotation matrix by the codeword in a predetermined codebook B to obtain the codeword of the class 2 codebook. The predetermined codebook B is obtained by compressing all the codewords in a known codebook C, with the compression being multiplying a compression matrix by the codebook C. This codebook C can be a class 1 codebook or other codebook given by the protocol.

In particular, the eNode B gives a known codebook C according to the rotation compression algorithm, for a codeword in the class 1 codebook A, the codeword of NBC class 2 codebooks are obtained after calculation, where NBC is a positive integral number greater than 1; and the step of obtaining the codeword of the class 2 codebook by calculation includes the following steps:

In step 1), a codebook B is obtained by compressing all the codewords in a given codebook C; the compression operation is implemented by multiplying a compression matrix by the codeword of another codebook C; and it needs to be noted that the given codebook C is a class 1 codebook or other codebook given by the protocol. If the given codebook C is a class 1 codebook, then the size of the codebook C is the that of the class 1 codebook, and the codeword of the codebook C is that of the class 1 codebook;

in step 2), every codeword in a class 1 codebook A has a corresponding rotation matrix, and the codeword of the class 2 codebook can be finally obtained by multiplying a rotation matrix by each codeword of the codebook B;

it needs to be noted that the present invention further includes a codebook B given by the protocol, and the class 2 codeword is obtained only by step 2); and the present invention further include a codebook C given by the protocol, and the class 2 codeword is obtained by directly carrying out rotation compression operation on C.

The compression operation is described by the following formula:

$$CWB(j) = MatCmprs(j) \cdot CWC(j)$$

where, $CWC(j)$ represents the $j^{th}$ codeword of the codebook C, codebook index $j=0, 1, \ldots, NBC$, NBC is a positive integral number greater than 1, $CWB(j)$ represents the $j^{th}$ codeword of the codebook B, and $MatCmprs(i)$ is a diagonal matrix, with the size thereof being $N_T \times N_T$, $$MatCmprs(j) = \begin{bmatrix} \sqrt{1-\alpha^2(1-\beta^2)}/\beta & & & \\ & \alpha & & \\ & & \ddots & \\ & & & \alpha \end{bmatrix},$$

where $\alpha$ is a constant representing the compression rate and is a positive real number, and $\beta$ represents the absolute value of the first element of the codeword $CWC(j)$.

The rotation operation is described by the following formula:

$$CW2(i,j) = MatRot(i) \cdot CWB(j)$$

where the class 1 codebook index $i=0, 1, \ldots, NB1$, codebook index $j=0, 1, \ldots, NBC$, $CWB(j)$ represents the $j^{th}$ codeword of the codebook B, $CW2(i, j)$ represents the $j^{th}$ codeword among NBC codewords obtained by rotating the $i^{th}$ codeword of the class 1 codebook, and NBC is the number of codewords in the codebook collection B. The $MatRot(i)$ is a function of $CW1(i)$, $CWB(j)$ represents the $i^{th}$ codeword of the class 1 codebook; for example, a unitary matrix $[CW1(i)\ O_{CW1(i)}^\perp]$ obtained according to CW1 (i) or a unitary matrix $[conj\ (CW1(i))\ O_{CW1(i)}^\perp]$, conj (CW1(i)) represents to conjugate CW1 (i), and $O_{CW1(i)}^\perp$ represents the $(N_T-1)^{th}$ column vector orthogonal with CW1 (i).

The rotation operation is described by the following formula: when CW1(i) is of one column, $MatRot(i)=HH(ℏ-CW1(i))$. HH represents Household transformation, $ℏ$ is $[1\ 0\ 0\ 0]^T$, and NB1 and NBC are positive integral numbers greater than 1.

The UE is under the SU-MIMO transmission mode, or MU-MIMO transmission mode, or hybrid transmission mode of SU-MIMO and MU-MIMO, the UE obtains the downlink channel information by measurement, compares the channel information obtained by measurement with the codeword by inquiring of a preset list, selects the closest codeword, and uses the corresponding codeword index as the PMI to be fed back to the eNB.

Hereinafter, another more particular example will be given:

assuming that the number of the transmission antenna ports is $N_T=4$, then the class 2 codebook will be directly defined in R10, and if any class of codebook index, any index value of class 2 codebook and any value of the total number of layers are given, a corresponding complex matrix can be directly defined in R10, i.e. the codeword of the class 2 codebook.

For example, assuming that the total known number of layers is $\upsilon=1$, the class 1 and class 2 codebook indexes are respectively indicated as i and j, $NB_1=NB_2=4$, then the codeword of the class 2 codebook is indicated as CW2, and the codeword of the class 1 codebook is indicated as CW1.

$\upsilon=1$ and i are given, and the class 1 codebook is an R8 codebook.

The codeword collection B can be obtained by compressing all the codewords in another given codebook C; and the compression operation is implemented by multiplying a compression matrix by the codeword of another codebook C;

the codeword collection C is directly given and is an R8 codebook, the definition thereof is as follows:

IndexC=0, CWC(0)=[0.5, 0.5, 0.5, 0.5]T;
IndexC=1, CWC(1)=[0.5, 0+0.5i, −0.5, 0−0.5i]T;
IndexC=2, CWC(2)=[0.5, −0.5, 0.5, −0.5]T;
IndexC=3, CWC(3)=[0.5, 0−0.5i, −0.5, 0+0.5i]T;
IndexC=4, CWC(4)=[0.5, 0.35355+0.35355i, 0+0.5i, −0.35355+0.35355i]T;
IndexC=5, CWC(5)=[0.5, −0.35355+0.35355i, 0−0.5i, 0.35355+0.35355i]T;
IndexC=6, CWC(6)=[0.5, −0.35355−0.35355i, 0+0.5i, 0.35355−0.35355i]T;
IndexC=7, CWC(7)=[0.5, 0.35355−0.35355i, 0−0.5i, −0.35355−0.35355i]T;
IndexC=8, CWC(8)=[0.5, 0.5, −0.5, −0.5]T;
IndexC=9, CWC(9)=[0.5, 0+0.5i, 0.5, 0+0.5i]T;
IndexC=10, CWC(10)=[0.5, −0.5, −0.5, 0.5]T;
IndexC=11, CWC(11)=[0.5, 0−0.5i, 0.5, 0−0.5i]T;
IndexC=12, CWC(12)=[0.5, 0.5, 0.5, −0.5]T;
IndexC=13, CWC(13)=[0.5, 0.5, −0.5, 0.5]T;
IndexC=14, CWC(14)=[0.5, −0.5, 0.5, 0.5]T;
IndexC=15, CWC(15)=[0.5, −0.5, −0.5, −0.5]T;

Herein, IndexC is the codebook index of the codeword collection C, CWC (IndexC) is the (IndexC)$^{th}$ codeword in the codeword collection C, and IndexC is a positive integral number greater than or equal to.

The codeword collection B is obtained by carrying out a compression operation on the codeword collection C and can be obtained by matrix multiplication as follows:

$$CWB(IndexB) = \begin{bmatrix} \sqrt{1-\alpha^2(1-\beta^2)}/\beta & 0 & 0 & 0 \\ 0 & \alpha & 0 & 0 \\ 0 & 0 & \alpha & 0 \\ 0 & 0 & 0 & \alpha \end{bmatrix} \cdot CWC(IndexB)$$

Here, IndexB=0, 1, 2, ... $2^{NBB}$, $\alpha$ is a constant representing the compression rate and is a positive real number, and $\beta$ represents the first element of the codeword CWC(IndexB), wherein $2^{NBB}$ is the total number of the codewords in the codebook C, and $(\bullet)^T$ represents a matrix transposition operation. There is a more particular example, where $\alpha$=0.5 and $\alpha$=0.5

The codeword collection B is obtained:
IndexB=0; CWB=[0.90139, 0.25, 0.25, 0.25]T
IndexB=1; CWB=[0.90139, 0+0.25i, −0.25, 0−0.25i]T
IndexB=2; CWB=[0.90139, −0.25, 0.25, −0.25]T
IndexB=3; CWB=[0.90139, 0−0.25i, −0.25, 0+0.25i]T
IndexB=4; CWB=[0.90139, 0.17678+0.17678i, 0+0.25i, −0.17678+0.17678i]T
IndexB=5; CWB=[0.90139, −0.17678+0.17678i, 0−0.25i, 0.17678+0.17678i]T
IndexB=6; CWB=[0.90139, −0.17678−0.17678i, 0+0.25i, 0.17678−0.17678i]T
IndexB=7; CWB=[0.90139, 0.17678−0.17678i, 0−0.25i, −0.17678−0.17678i]T
IndexB=8; CWB=[0.90139, 0.25, −0.25, −0.25]T
IndexB=9; CWB=[0.90139, 0+0.25i, 0.25, 0+0.25i]T
IndexB=10; CWB=[0.90139, −0.25, −0.25, 0.25]T
IndexB=11; CWB=[0.90139, 0−0.25i, 0.25, 0−0.25i]T
IndexB=12; CWB=[0.90139, 0.25, 0.25, −0.25]T
IndexB=13; CWB=[0.90139, 0.25, −0.25, 0.25]T
IndexB=14; CWB=[0.90139, −0.25, 0.25, 0.25]T
IndexB=15; CWB=[0.90139, −0.25, −0.25, −0.25]T Here, IndexB is the codebook index of the codeword collection B, and CWB is a codeword of the codeword collection B.

Furthermore, if the codeword collection B is known, then the codeword of the class 2 codebook can be obtained by a rotation operation. In particular, the codeword of the class 2 codebook can be obtained by matrix multiplication as follows:

$$CW2(i,j) = \text{Mat}_{rot}(i) \cdot CWB(j) \; i=0, 1, 2, \ldots, NB1 \; j=0, 1, 2, \ldots, NB2$$

As to the definition of rotation matrix, more particularly, here is an example, assuming that the number of the transmission antenna ports is 4, and the level 1 codebook in the above example has 16 codewords, which is mainly the codebook of R8. A codeword collection $u_n$ is known, and the definition thereof is as follows:

n=0; Un(n)=[1, −1, −1, ]T
n=1; Un(n)=[1, 0−1i, 1, 1]T
n=2; Un(n)=[1, 1, −1, 1]T
n=3; Un(n)=[1, 0+1i, 1, 1]T
n=4; Un(n)=[1, −0.70711−0.70711i, 0−1i, 1]T
n=5; Un(n)=[1, 0.70711−0.70711i, 0+1i, 1]T
n=6; Un(n)=[1, 0.70711+0.70711i, 0−1i, 1]T
n=7; Un(n)=[1, −0.70711+0.70711i, 0+1i, 1]T
n=8; Un(n)=[1, −1, 1, 1]T
n=9; Un(n)=[1, 0−1i, −1, 1]T
n=10; Un(n)=[1, 1, 1, 1]T
n=11; Un(n)=[1, 0+1i, −1, 1]T
n=12; Un(n)=[1, −1, −1, 1]T
n=13; Un(n)=[1, −1, 1, 1]T
n=14; Un(n)=[1, 1, −1, 1]T
n=15; Un(n)=[1, 1, 1, 1]T

The rotation matrix is $\text{Mat}_{rot}(i) = I - 2u_n(i)u_n(i)^H / u_n(i)^H u_n(i)$.

The codeword of the class 2 codebook can be obtained in conjunction with the rotation matrix and the codeword collection B according to the matrix multiplication formula of the rotation operation. Considering i=0, then the following can be obtained:

i=0, j=0; CW2=[0.82569, 0.32569, 0.32569, 0.32569]T
i=0, j=1; CW2=[0.32569, 0.57569−0.25i, 0.32569, 0.57569+0.25i]T
i=0, j=2; CW2=[0.32569, 0.32569, 0.82569, 0.32569]T
i=0, j=3; CW2=[0.32569, 0.57569+0.25i, 0.32569, 0.57569−0.25i]T
i=0, j=4; CW2=[0.45069−0.30178i, 0.62747+0.125i, 0.45069+0.051777i, 0.27392+0.125i]T
i=0, j=5; CW2=[0.45069−0.051777i, 0.27392−0.125i, 0.45069+0.30178i, 0.62747−0.125i]T
i=0, j=6; CW2=[0.45069+0.051777i, 0.27392+0.125i, 0.45069−0.30178i, 0.62747+0.125i]T
i=0, j=7; CW2=[0.45069+0.30178i, 0.62747−0.125i, 0.45069−0.051777i, 0.27392−0.125i]T
i=0, j=8; CW2=[0.32569, 0.82569, 0.32569, 0.32569]T
i=0, j=9; CW2=[0.57569−0.25i, 0.32569, 0.57569+0.25i, 0.32569]T
i=0, j=10; CW2=[0.32569, 0.32569, 0.32569, 0.82569]T
i=0, j=11; CW2=[0.57569+0.25i, 0.32569, 0.57569−0.25i, 0.32569]T
i=0, j=12; CW2=[0.57569, 0.57569, 0.57569, 0.075694]T
i=0, j=13; CW2=[0.57569, 0.57569, 0.075694, 0.57569]T
i=0, j=14; CW2=[0.57569, 0.075694, 0.57569, 0.57569]T
i=0, j=15; CW2=[0.075694, 0.57569, 0.57569, 0.57569]T

It needs to be specially noted that the class 2 codeword of the present invention is not limited to the above values.

Embodiment 5

The present embodiment mainly describes how to generate the codeword of the class 2 codebook by the phase adjustment algorithm according to the codeword of the class 1 codebook, and the method of this embodiment can be used in conjunction with the methods in the above embodiments 2 and 3.

The step of the eNode B obtaining the codeword of the class 2 codebook by calculation according to the phase adjustment algorithm includes the following steps.

Every codeword in the class 1 codebook A has a corresponding phase adjustment matrix, the codeword of NJ class 2 codebooks can be finally obtained by carrying out phase adjustment on each element in the codeword of the class 1 codebook A; and the phase adjustment operation is implemented by multiplying a phase adjustment matrix by the codeword of the class 1 codebook, and NJ is a positive integral number greater than 1;

the phase adjustment operation is described by the following formula:

$$CW2(i,j) = \text{MatPhsAdj}(j) \cdot CW1(i)$$

where CW1 (i) represents the $i^{th}$ codeword of the class 1 codebook, and MatPhsAdj(j) is a diagonal matrix.

$$\text{MatPhsAdj}(j) = \begin{bmatrix} \exp((-1)^{1/2} \cdot \theta_j) & & & \\ & \exp((-1)^{1/2} \cdot 2\theta_j) & & \\ & & \exp((-1)^{1/2} \cdot 3\theta_j) & \\ & & & \exp((-1)^{1/2} \cdot 4\theta_j) \end{bmatrix}$$

-continued $$\begin{bmatrix} \exp((-1)^{1/2} \cdot \gamma_{0j}) & & & \\ & \exp((-1)^{1/2} \cdot \gamma_{1j}) & & \\ & & \ddots & \\ & & & \exp((-1)^{1/2} \cdot \gamma_{(N_T-1)j}) \end{bmatrix}$$

$\gamma_{0j}, \gamma_{1j}, \ldots, \gamma_{(N_T-1)j}$ respectively represent to carry out phase adjustment on the first to the $(N_T)^{th}$ element in CW1 (i) with the values thereof being within 0 to $2\pi$ or $-\pi$ to $+\pi$. CW2(i, j) represents to obtain the $j^{th}$ codeword in the NJ codewords by carrying out phase adjustment on the $i^{th}$ of the class 1 codebook.

Furthermore, the $\gamma_{0j}, \gamma_{1j}, \ldots, \gamma_{(N_T-1)j}$ satisfy $\gamma_{ij} = (i+1) \cdot \theta_j$, wherein $i=0, 1, \ldots, N_{T-1}, j=0, 1, \ldots, NJ$, $\theta_j$ is a phase value and the value thereof is within 0 to $2\pi$ or $-\pi$ to $+\pi$, and NJ is a positive integral number greater than 1.

Hereinafter, another more particular example will be given:

assuming that the number of the transmission antenna ports d is $N_T=4$, then the class 2 codebook will be directly defined in R10, and if any class of codebook index, any index value of class 2 codebook and any value of the total number of layers are given, a corresponding complex matrix can be directly defined in R10, i.e. the codeword of the class 2 codebook.

For example, assuming that the total known number of layers is $\upsilon=1$, the class 1 and class 2 codebook indexes are respectively indicated as i and j, $NB_1=NB_2=4$, then the codeword of the class 2 codebook is indicated as CW2, and the codeword of the class 1 codebook is indicated as CW1.

$\upsilon=1$ and i are given, and the codeword definition of the class 1 codebook is as follows:

i=0; CW1=[0.5, 0.5, 0.5, 0.5] T
i=1; CW1=[0.5, 0+0.5i, −0.5, 0−0.5i]T
i=2; CW1=[0.5, −0.5, 0.5, −0.5]T
i=3; CW1=[0.5, 0−0.5i, −0.5, 0+0.5i]T
i=4; CW1=[0.5, 0.35355+0.35355i, 0+0.5i, −0.35355+0.35355i]T
i=5; CW1=[0.5, −0.35355+0.35355i, 0−0.5i, 0.35355+0.35355i]T
i=6; CW1=[0.5, −0.35355−0.35355i, 0+0.5i, 0.35355−0.35355i]T
i=7; CW1=[0.5, 0.35355−0.35355i, 0−0.5i, −0.35355−0.35355i]T
i=8; CW1=[0.5, 0.5, −0.5, −0.5]T
i=9; CW1=[0.5, 0+0.5i, 0.5, 0+0.5i]T
i=10; CW1=[0.5, −0.5, −0.5, 0.5]T
i=11; CW1=[0.5, 0−0.5i, 0.5, 0−0.5i]T
i=12; CW1=[0.5, 0.5, 0.5, −0.5]T
i=13; CW1=[0.5, 0.5, −0.5, 0.5]T
i=14; CW1=[0.5, −0.5, 0.5, 0.5]T
i=15; CW1=[0.5, −0.5, −0.5, −0.5]T

Assuming $\theta_{j=0}=-3\pi/32$, $\theta_{j=1}=-\pi/32$, $\theta_{j=1}=-\pi/32$, $\theta_{j=3}=+3\pi/32$, and NJ=4, then the diagonal matrix of phase adjustment is as follows:

Assuming i=0, then CW1 (i=0)=$[0.5, 0.5, 0.5, 0.5]^T$ and 4 codewords of the class 2 codebook will be generated.

The generated codewords of the class 2 codebook are as follows:

CW2(0, 0)=MatPhsAdj(j=0)·CW1(i=0)
=$[0.5000, -0.4950-0.0706i, 0.4801+0.1397i, 0.4801+0.1397i]^T$

CW2(0, 1)=MatPhsAdj(j=1)·CW1(i=0)
=$[0.5000, 0.2702-0.4207i, -0.2081-0.4546i, -0.2081-0.4546i]^T$

CW2(0, 2)=MatPhsAdj(j=2)·CW1(i=0)
=$[0.5000, 0.2702+0.4207i, -0.2081+0.4546i, -0.2081+0.4546i]^T$

CW2(0, 3)=MatPhsAdj(j=3)·CW1(i=0)
=$[0.5000, -0.4950+0.0706i, 0.4801-0.1397i, 0.4801-0.1397i]^T$

It needs to be specially noted that the value of the codeword of the class 2 codebook is not limited to the described examples.

In the above embodiments 2 and 3, when the codewords of the class 2 codebook is generated, they can be generated using the method of embodiment 4 separately, or generated using the method of embodiment 5 separately, or a part of the codewords of the class 2 codebook can be generated using the method of embodiment 4 by a part of the codewords of class 1 codebook, and the remaining codewords of the class 2 codebook can be generated using the method of embodiment 5 by another part of the codewords of the class 1 codebook.

In particular, for a part of the codewords of class 1 codebook A, each of them has a corresponding phase adjustment matrix, and phase adjustment is carried out on each element in the codewords of class 1 codebook A, and finally the codewords of the class 2 codebook are obtained, which is similar to the method of embodiment 5;

each of the other codewords in the class 1 codebook A has a corresponding rotation matrix, and each codeword in a known codeword collection B is rotated to the surrounding of a class 1 codeword in the class 1 codebook A to finally obtain the codewords of the class 2 codebook, which is similar to the method of embodiment 4.

A particular example of such hybrid mode is as follows:

the class 1 codebook is a Rel-8 codebook, and the codewords of the class 2 codebook are obtained by extending the codewords of the class 1 codebook;

there are two extension forms to improve the feedback precision of different types of channels;

the former 8 codewords in the R8 codebook are DFT codewords, which are suitable for relevant channels. The following extension of the former 8 codewords is used for generating a part of the codewords of the class 2 codebook.

$$CW2(i, j) = \begin{bmatrix} 1 & 0 & 0 & 0 \\ 0 & \exp\left((-1)^{1/2}\frac{\pi(2j-5)}{32}\right) & 0 & 0 \\ 0 & 0 & \exp\left((-1)^{1/2}\frac{2\pi(2j-5)}{32}\right) & 0 \\ 0 & 0 & 0 & \exp\left((-1)^{1/2}\frac{3\pi(2j-5)}{32}\right) \end{bmatrix} CW1(i)$$

Herein, i=0, 1, 2, . . . , 7, and j=0, 1, 2, 3 the former 8 codeword in the R8 codebook is DFT codeword are suitable for irrelevant channels. The following extension of the former 8 codeword is used for generating the remaining part of the codewords of the class 2 codebook.

$$CW2(i, j) = MatRot(j) \begin{bmatrix} \sqrt{1-\alpha^2(1-\beta^2)}/\beta & 0 & 0 & 0 \\ 0 & \alpha & 0 & 0 \\ 0 & 0 & \alpha & 0 \\ 0 & 0 & 0 & \alpha \end{bmatrix} \cdot CW1(i)$$

Herein, i=8, 9, . . . , 15 and j=0, 1, 2, 3; as to a UMi channel, $\alpha$=0.5; and as to a 3GPP Case 1 channel, $\alpha$=0.2.

To obtain different codewords by selecting different algorithms depends on the simulation result, and the selected result is to maximize the system throughput or maximize the system efficiency.

Embodiment 6

As shown in FIG. 1, hereinafter, the general processing procedure of the dynamic transmission mode switching between the single user-MIMO and multiple user-MIMO will be described, which comprises the following steps.

In step S101, a transmitting end eNB sends downlink channel information pilot reference information to a user equipment (UE) for the user equipment to test the state of the downlink channel;

in step 103, the UE carries out downlink channel estimation according to the received pilot information;

in step 105, the UE determines the format to feedback the channel state information, including a class 1 codebook index and a class 2 codebook index;

in step 107, the UE reports to the eNB the channel state information including the class 1 codebook index and the class 2 codebook index;

in step 109, the eNB dynamically selects downlink SU-MIMO transmission or MU-MIMO transmission mode according to the reported channel state information, and it uses the class 1 codebook index to obtain the codeword of the class 1 codebook under SU-MIMO transmission mode, uses the class 2 codebook index to obtain the codeword of the class 2 codebook under MU-MIMO transmission mode, and communicates with the UE by generating a weight using the obtained codeword according to the selected transmission mode.

Embodiment 7

Figure 2:
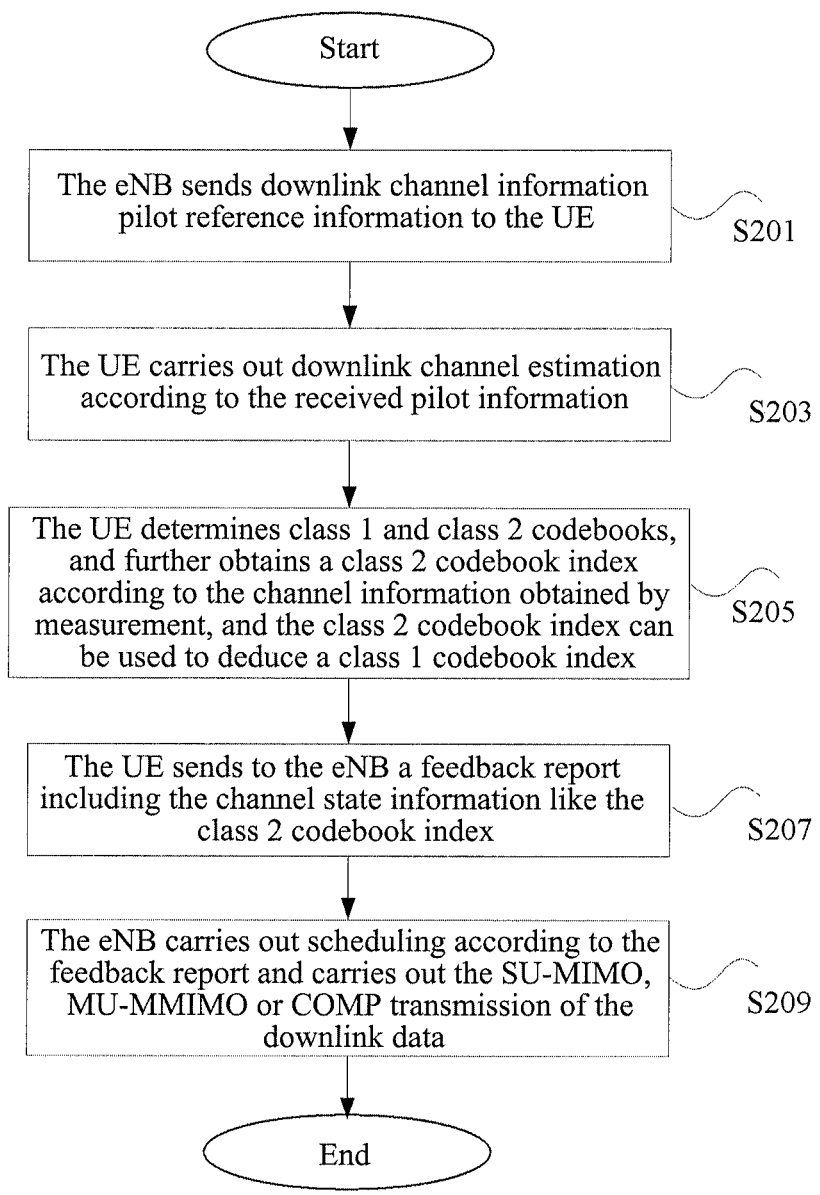
FIG. 2 is a communication process of single user-MIMO or multi user-MIMO using the codebook generation method in embodiment 2.

As shown in FIG. 2, hereinafter, the general processing procedure of the dynamic transmission mode switching between the single user-MIMO and multiple user-MIMO will be described, including:

In step 201, a transmitting end eNB sends downlink channel information pilot reference information to a user equipment (UE) for the user equipment to test the state of the downlink channel;

in step 203, the UE carries out downlink channel estimation according to the received pilot information;

in step 205, the UE determines the format to feedback the channel state information, including a class 2 codebook index;

in step 207, the UE reports to the eNB the channel state information including the class 2 codebook index;

in step 209, the eNB dynamically selects downlink SU-MIMO transmission or MU-MIMO transmission mode according to the reported channel state information, and it uses the class 2 codebook index to deduce the class 1 codebook index so as to obtain the codeword of the class 1 codebook under SU-MIMO transmission mode, directly uses the class 2 codebook index to obtain the codeword of the class 2 codebook under MU-MIMO transmission mode, and communicates with the UE by generating a weight using the obtained codeword according to the selected transmission mode.

A system implementing the above method includes a UE and an eNode B, wherein the UE is configured to report codebook index information and information about the total number of layers to the eNode B, wherein the codebook index information comprises one of the following information: class 2 codebook index l; and class 1 codebook index i and index parameter j; and the eNode B is configured to, after receiving the codebook index information and information about the total number of layers sent by the UE, obtain a codeword by the eNode B in the manner of inquiring of a preset codebook list or in the manner of inquiring of the preset codebook list in conjunction with calculation according to the codebook index information and information about the total number of layers.

For the particular operations of the UE and eNode B, please refer to the above method.

By way of the present invention, the method can provide channel state information with enough precision to the MU-MIMO system.

It needs to be noted that if there is no conflict, the embodiments of the present invention and the various features in the embodiments can be combined with each other, which are all within the scope of protection of the present invention. Furthermore, the steps shown in the flowcharts of the accompanying drawings can be performed in a computer system such as a set of computer executable instructions, and although the logical orders are shown in the flowcharts, the steps shown or described can be performed in an order different from the order here in certain cases.

INDUSTRIAL APPLICABILITY

In the present invention, on one hand, the network side can be compatible to use the channel state information format of the R8 to implement the multi-antenna function of the R8 release, such as single user-MIMO; on the other hand, the network side significantly reduces quantization errors by way of a new codebook of R10, thereby greatly enhancing the performance of the MU-MIMO system. By way of the new method for generating and representing a new codebook, the transmission efficiency and transmission quality can be improved, which solves the problem that the MU-MIMO lacks accurate channel state information.

What we claim is:

1. A method for acquiring channel state information comprising:
    a user equipment (UE) reporting codebook index information and information about a total number of layers to an eNode B (eNB), wherein the codebook index information comprises class 1 codebook index i and index parameter j; and
    after receiving the codebook index information and the information about the total number of layers sent by the UE, the eNB obtaining the codeword by inquiring of the preset codebook list using the class 1 codebook index I, index parameter j, and the total number of layers υ as an index, with the preset codebook list including a table 1;
    wherein as to table 1, if a class 1 codebook index I, and index parameter j and a total number of layers υ are given, a unique complex matrix $CMat_{ij}^{\nu}$ will be directly given, wherein $i=0,1,\ldots,2^{NB_1}$, $j=0,1,\ldots,2^{NB_2}$, $CMat_{ij}^{\nu}$ represents a codeword of a class 2 codebook and is a complex matrix, $NB_1$ and $NB_2$ are positive integral numbers greater than 0 and respectively represent the size of the class 1 codebook and that of the class 2 codebook, wherein $CMat_{ij}^{\nu}$ is a $N_T \times 1$ matrix or a $N_T \times 2$ matrix; and $N_T$ represents a number of antenna ports of the eNB.

2. The method of claim 1, wherein the codebook corresponding to the class 1 codebook index is a codebook of release 8 (R8) or a codebook obtained by a mathematical transformation of the codebook of R8; and the codebook corresponding to the class 2 codebook index is a new codebook of release 10 (R10).

3. The method of claim 1 further comprising:
    the eNB scheduling the UE by referring to the obtained codeword, selecting a downlink transmission manner to communicate with the UE, wherein the downlink transmission manner comprises one of the following: single user multiple input multiple output transmission mode, multi-user multiple input multiple output transmission mode, single user/multi-user dynamic switching transmission mode and coordinated multiple point transmission mode.

4. The method of claim 1, wherein the class 2 codebook is a new codebook of release 10(R10).

5. A method for acquiring channel state information comprising:
    a user equipment (UE) reporting codebook index information and information about a total number of layers to an eNode B (eNB), wherein the codebook index information comprises class 1 codebook index i and index parameter j; and
    after receiving the codebook index information and the information about the total number of layers sent by the UE, the eNB obtains the codeword by inquiring of the preset codebook list using the class 1 codebook index i, index parameter j, and the total number of layers υ as an index, with the preset codebook list including a table 2; wherein,
    as to table 2, if the class 1 codebook index i and a total number of layers υ are given, a unique complex matrix $AMat_i^{\nu}$ will be directly given, where $i=0,1,\ldots,2^{NB_1}$, $AMat_i$ represents a codeword of a class 1 codebook and is a complex matrix of $N_T \times \nu$, and $NB_1$ is a positive integral number greater than 0 and represents the size of the class 1 codebook; and
    $N_T$ represents the number of antenna ports of the eNB.

6. The method of claim 5, wherein the codebook corresponding to the class 1 codebook index is a codebook of release 8(R8) or a codebook obtained by a mathematical transformation of the codebook of R8.

7. The method of claim 5 further comprising:
    the eNB scheduling the UE by referring to the obtained codeword, selecting a downlink transmission manner to communicate with the UE, wherein the downlink transmission manner comprises one of the following: single user multiple input multiple output transmission mode, multi-user multiple input multiple output transmission mode, single user/multi-user dynamic switching transmission mode and coordinated multiple point transmission mode.

* * * * *